United States Patent
Nommensen

(10) Patent No.: US 11,098,537 B2
(45) Date of Patent: Aug. 24, 2021

(54) CENTRALISING ASSEMBLY FOR A DOWNHOLE DEVICE, COUPLING DEVICE INCLUDING A CENTRALISING DEVICE AND METHOD OF MANUFACTURE

(71) Applicant: COBALT EXTREME PTY LTD, Woolloongabba (AU)

(72) Inventor: David C. Nommensen, Brisbane (AU)

(73) Assignee: COBALT EXTREME PTY LTD, Woolloongabba (AU)

( * ) Notice: Subject to any disclaimer, the term of this patent is extended or adjusted under 35 U.S.C. 154(b) by 15 days.

(21) Appl. No.: 16/295,861

(22) Filed: Mar. 7, 2019

(65) Prior Publication Data

US 2020/0165881 A1   May 28, 2020

(30) Foreign Application Priority Data

Nov. 26, 2018 (AU) .............................. 2018904491

(51) Int. Cl.
| | | |
|---|---|---|
| E21B 17/10 | (2006.01) | |
| E21B 19/24 | (2006.01) | |
| E21B 17/00 | (2006.01) | |
| E21B 17/042 | (2006.01) | |
| B29C 45/17 | (2006.01) | |

(52) U.S. Cl.
CPC ...... *E21B 17/1078* (2013.01); *B29C 45/1704* (2013.01); *E21B 17/00* (2013.01); *E21B 17/042* (2013.01); *E21B 17/10* (2013.01); *E21B 17/1042* (2013.01); *E21B 17/1057* (2013.01); *E21B 17/1071* (2013.01); *E21B 17/1085* (2013.01); *E21B 19/24* (2013.01)

(58) Field of Classification Search
CPC .......... E21B 19/24; E21B 17/00; E21B 17/10; E21B 17/1057; E21B 17/1078; E21B 17/1085; B29C 45/1704
USPC .......................................... 264/328.1
See application file for complete search history.

(56) References Cited

U.S. PATENT DOCUMENTS

| | | | | |
|---|---|---|---|---|
| 3,755,262 | A * | 8/1973 | Slagel ................. | C08G 18/10 528/66 |
| 6,075,073 | A * | 6/2000 | McGlothlin ............. | C08J 3/07 210/637 |
| 7,632,045 | B2 * | 12/2009 | Wu ..................... | E21D 21/0046 405/259.1 |
| 9,869,135 | B1 * | 1/2018 | Martin .................. | E21B 17/1071 |
| 2018/0080288 | A1 | 3/2018 | Nommensen et al. | |

FOREIGN PATENT DOCUMENTS

| | | |
|---|---|---|
| AU | 366996 | 2/2016 |
| AU | 201710344 | 2/2017 |
| AU | 201812056 | 5/2018 |
| AU | 201815446 | 10/2018 |
| AU | 201815863 | 11/2018 |

* cited by examiner

*Primary Examiner* — Tara Schimpf
*Assistant Examiner* — Manuel C Portocarrero
(74) *Attorney, Agent, or Firm* — Greer, Burns & Crain, Ltd.

(57) ABSTRACT

A centralising assembly for a downhole device in the mining or oil well field, a method of manufacture therefor and to a coupling device including a centralising device.

20 Claims, 12 Drawing Sheets

∿∿∿ = Residue of long-chain diol (ether/ester)
——— = Residue of short-chain diol
——— = Residue of diisocyanate
○ = Urethane group

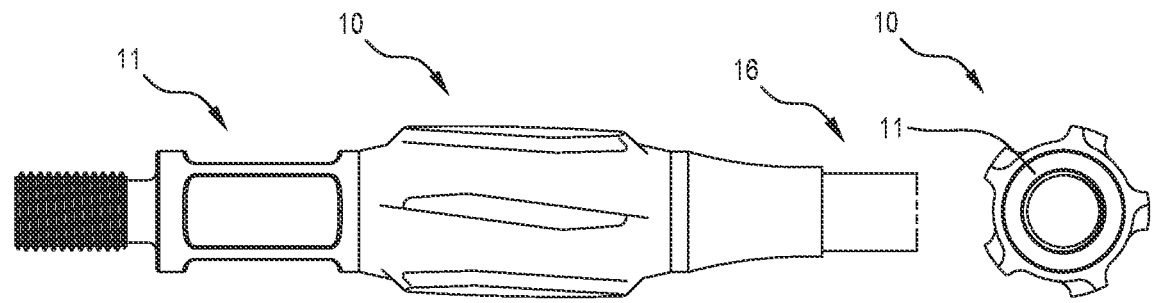
*Figure 15*  *Figure 16*
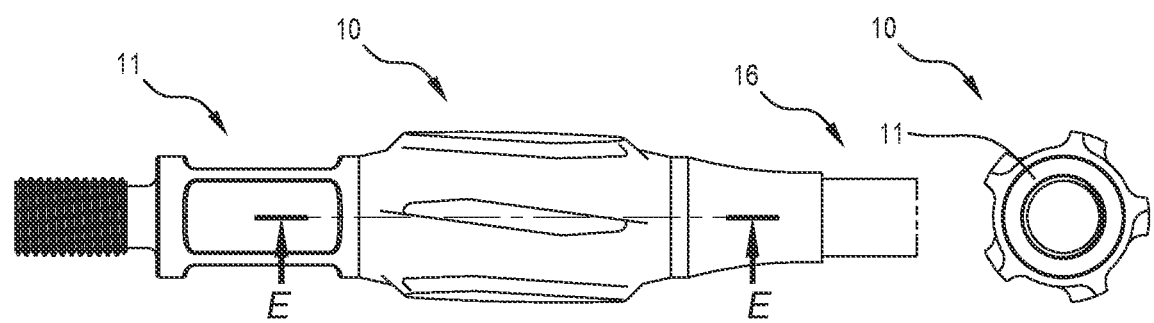
*Figure 17*  *Figure 18*
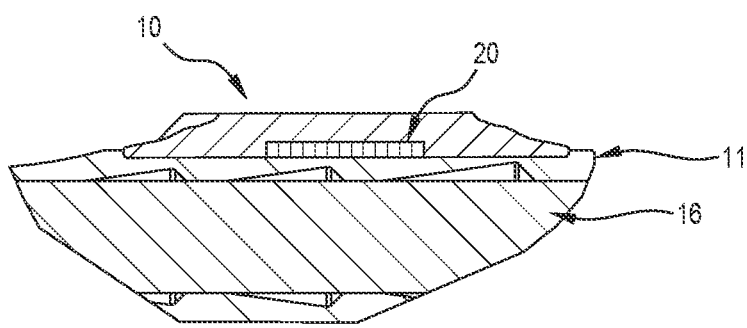
*Figure 19*

CENTRALISING ASSEMBLY FOR A DOWNHOLE DEVICE, COUPLING DEVICE INCLUDING A CENTRALISING DEVICE AND METHOD OF MANUFACTURE

TECHNICAL FIELD

The present invention relates generally to the field of downhole devices in the mining or oil well field and more particularly to a centralising assembly for a downhole device and a method of manufacture therefor and to a coupling device including a centralising device.

BACKGROUND

U.S. Pat. No. 6,193,431 discloses a sucker rod end fitting for attachment to a fibreglass sucker rod, the end fitting including a rod receptacle having a closed axially inner end and an open axially outer end, wherein the rod receptacle comprises a plurality of integrally formed, outwardly converging, axially aligned annuluses, each annulus being tapered to be of decreasing diameter toward the open end and defining a plurality of transition surfaces between each of the annuluses, wherein each of the transition surfaces comprises a wave-shaped cross-section.

Sucker rods are connected together in a string by steel connectors attached to the ends of each rod. With the solving of rod manufacturing problems. Such as looping, the steel connectors or end fittings between rods have proven to be the source of most composite rod failures or end fitting pullouts. Therefore, the sucker rod connectors have been the focus of recent efforts to improve the reliability of fiberglass or composite sucker rod construction.

The end fittings comprise a rod receptacle at one end to receive the rod end, and a threaded coupling at the other end to threadedly connect to the end fitting of the next successive rod. The space between the interior wall of the rod receptacle and the external surface of the rod defines a space or annulus which is filled with epoxy or some other initially flowable adhesive such as epoxy. The epoxy cures into a solid, which bonds to the rod. Typically, the adhesive is heat activated and heat is applied to the rod as a curing agent. Early experiments with such connectors resulted in rod pullouts, where the rod is pulled out of the connector rod receptacle causing failure of the string. Such string failure can be catastrophic, requiring expensive repairs or even well closure.

Current end fittings are formed such that the epoxy cures into a series of wedges that cooperatively engage complimentary surfaces in the rod receptacle to prevent rod pullouts.

U.S. Pat. No. 9,869,135 (U.S. Pat. No. 9,869,135) discloses sucker rod components and to modifications and attachments to the sucker rod system to improve overall well performance. This document has a particularly useful discussion in the background art section relating to the issues surrounding sucker rod strings.

As explained in U.S. Pat. No. 9,869,135, sucker rod sections typically vary in length depending on the well conditions and may be present in sections that are from shorter "pony rods" of 2 to 10 feet, particularly near the top of the well, to longer rods of 25 or 30 feet long or more, coupled to extend thousands of feet into the ground to reach an underground oil reservoir. The sucker rod sections typically have a long and slender central shaft portion with externally threaded "upset" ends, also called "pins," of somewhat larger diameter to strengthen the joint. Sucker rods are joined end-to-end by much shorter, internally threaded, couplings or "rod boxes." In the usual case, the coupling is of somewhat larger diameter than the long and slender shaft section of sucker rod in between couplings and may be of the same or larger diameter than the largest diameter of the sucker rod upsets.

Crude oil and other produced formation fluids pass along the outside diameter of the sucker rod and around the couplings in the annular space between the sucker rod string and the inner surface of the production tubing in which the sucker rod string is contained. Natural gas typically flows in the annular space defined by the exterior surface of the production tubing and the inner surface of the well casing.

The sucker rod string, comprising couplings and rod segments, is surprisingly flexible. Tubing deviations from straight line are common and may include wells that have horizontal terminal segments. Lengthy sucker rod strings frequently abrade against the side of the production tubing and can wear the tubing and the sucker rod string and may result in breaking the rods and couplings. Pumping efficiency is reduced by frictional losses and down time for repairs and the repairs can be costly.

Numerous efforts have been made over the years to reduce abrasion, the impact of sucker rod wear, including the sucker rod wearing through the production tubing, and breaks in the rod string. For example, sucker rods may have centralizer guides of assemblies with radially extending fins that contact the interior surface of the production tubing to space the rod from the tubing. The spaces between the fins provide flow channels for crude oil and other produced formation fluids.

It would be desirable to develop longer lasting, more efficient, tougher sucker rod strings and other downhole devices that break less frequently, require less maintenance, and perform better in lifting crude oil and other fluids, including water. Water and other fluids can impede the free flow of natural gas, especially in the casing surrounding the production tube. It would also be desirable to develop such sucker rod strings and other downhole devices that are readily and easily integrated into existing systems for pumping crude oil and into processes for the manufacture of sucker rods, couplings, and other components of the sucker rod string and other downhole devices.

In an attempt to solve the abovementioned problems, U.S. Pat. No. 9,869,135, discloses a guide formed from a fiber reinforced thermoset polymer composite matrix.

It will be clearly understood that, if a prior art publication is referred to herein, this reference does not constitute an admission that the publication forms part of the common general knowledge in the art in Australia or in any other country.

SUMMARY

The present invention is directed to a centralising device for a downhole device, coupling device including a centralising device and method of manufacture, which may at least partially overcome at least one of the abovementioned disadvantages or provide the consumer with a useful or commercial choice.

With the foregoing in view, the present invention in one form, resides broadly in a centralising assembly for a downhole device to centre the downhole device in a tubular portion, the centralising assembly including an elongate, annular guide body for mounting on the downhole device coaxially about a portion of the downhole device, the guide body comprising a non-fibre reinforced copolymer matrix and having at least two generally longitudinally directed fins on the guide body of the centralising assembly and defining passages therebetween for the passage of fluid, the fins abutting the interior surface of a tubular portion into which the downhole device is located in use and defining sacrificial wear surfaces against the tubular portion.

In an alternative form, the invention resides in a coupling device for releasably coupling downhole devices relative to one another, the coupling device including
- a) an elongate body portion with an attachment portion at at least one end thereof to attach the coupling device to an adjacent downhole component and
- b) a centralising assembly to centre the downhole device in a tubular portion, the centralising assembly including an elongate, annular guide body provided on the downhole device coaxially about a portion of the downhole device, the guide body comprising a non-fibre reinforced, copolymer matrix and having at least two generally longitudinally directed fins on the body and defining passages therebetween for the passage of fluid, the fins abutting the interior surface of a tubular portion into which the downhole device is located in use and defining sacrificial wear surfaces against the tubular portion In a further alternative form, the invention resides in a method of manufacturing a centralising device for a downhole device including the steps of:
- a) Injection of a non-fibre reinforced, copolymer matrix into a cold runner mold cavity through a mold gate from a nozzle via one or more sprue passages to fills one or more runners that lead to the mold cavity;
- b) Cooling the one or more sprue passages, one or more runners, and mold gate together with a molded centralising device; and
- c) Ejecting the molded centralising device from the mold cavity to separate one or more sprues which have solidified in the one or more sprue passages from the molded centralising device.

The centralising assembly of the present invention may be used in relation to any type of downhole device for example, a sucker rod or sucker rod string which typically moves in a reciprocating direction or a drill rod or drill rod string which typically rotates without substantial reciprocal movement (although reciprocating movement may also occur).

Generally, at least one centralising assembly will be provided relative to a downhole device with a number of downhole devices attached together and used end-to-end to create a string which extends over the length or a part of the length of the hole. Typically, a number of centralising assemblies will be used over the length of a downhole string.

The centralising assembly may be fixed relative to the downhole device or may be rotatable relative to the downhole device. Typically, the centralising assembly is fixed in position relative to the downhole device, over the length of the downhole device and may rotate relative to the downhole device or not.

The centralising assembly of the present invention will typically function as a sacrificial wear assembly, undergoing wear in order to maintain the downhole device substantially centrally within the tubular portion.

The centralising assembly of the present invention may be formed about the downhole device using an extruded and preferably a moulding process or alternatively, the centralising assembly may be formed separately from the downhole device and applied or secured in position relative to the downhole device before the downhole device is inserted into the tubular portion.

The centralising assembly of the present invention includes an elongate, annular guide body for mounting the centralising assembly on the downhole device. The centralising assembly may be formed in a single piece or may be formed in more than one piece which are then attachable together to secure the centralising assembly in position relative to the downhole device.

The guide body may be or include a closed annular body or an open annular body. In one preferred form, an open annular body may be used which is substantially annular but with a slot or break extending longitudinally along at least a portion of the length of the body to allow application of the annular body relative to the downhole device. The slot or break in the body may be linear or not. In one preferred embodiment where an open annular body is used, it is preferred that the slot or break has a sawtooth appearance and extends over the length of the annular body.

The annular body will typically be provided with a substantially central bore extending through the length of the body. The central bore will typically be generally circular but the cross-sectional shape of the central bore will largely depend on the external shape of the downhole device in the position relative to which the centralising assembly is to be mounted to the downhole device.

The central bore will typically be sized relative to the downhole device to allow friction fit to be used (although an attachment mechanism material such as an adhesive may be used in order to securely attach the body relative to the downhole device).

As mentioned above, the centralising assembly may be fixed in position relative to the downhole device or not. The centralising assembly may be fixed against linear movement with rotation allowed or both linear movement and rotation movement may be substantially minimised or prevented.

The guide body will preferably have a generally cylindrically shaped bore.

The guide body will preferably have a generally cylindrically shaped outer surface.

Typically, the at least two generally longitudinally directed fins will extend radially from an outer surface of the guide body. In other embodiments, the fins may be formed by providing one or more depressions into the body to form the passages.

The guide body will typically have a pair of substantially annular end edges. It is preferred that each of the end edges is substantially planar. Preferably, each of the end edges is substantially perpendicular to the longitudinal axis of the downhole device relative to which the centralising assembly is mounted.

An angled or tapered portion is preferably provided adjacent to at least one, and preferably both of the end edges with the angled or tapered portion tapering outwardly between the outer portion of the end edge and the outer, preferably cylindrical surface of the guide body. Without wishing to be limited by theory, the provision of an angled or tapered portion will typically minimise the formation of vortices or eddy flow patterns when the centralising assembly is in use in fluid. The formation of vortices or eddy flow patterns at the ends of the centralising assembly may create optimum conditions for corrosion to occur in the downhole device and are therefore preferably avoided. Alternatively, the end edges may be located at least partially and preferably almost completely within the depth of the rebate.

The centralising assembly of the present invention includes at least two generally longitudinally directed fins extending radially from the body of the centralising assembly. At least two fins will be provided but typically more than two fins will be used. The optimum number and configuration of the at least two fins will typically be determined according to the use to which the downhole device is to be put as well as other factors including any fluid that the downhole device may be exposed to and the movement of the downhole device if any.

A number of fins are preferably provided spaced circumferentially about the external surface of the guide body. The fins may extend substantially linearly relative to the guide body or not. The fins may be oriented substantially parallel to the longitudinal axis of the downhole device or not.

The fins will typically extend radially relative to the central axis of the downhole device relative to which the centralising assembly is mounted. Alternatively, one or more of the fins provided may be provided at an angle relative to the outer surface of the body which is something other than substantially perpendicularly. Again, this will typically be determined according to the particular use to which the downhole device and the centralising assembly is to be put.

Each of the fins provided will typically have an angled end edges. Typically, the angle of the end edges of each of the fins will substantially match the taper of the tapered portion provided between the end edge of the centralising assembly and the cylindrical surface of the body.

The fins may have any cross-sectional shape and in one form, will have a substantially rectangular cross-sectional shape.

A passage is typically defined between adjacent fins. The passage may have any shape or configuration, and may extend any length over the guide body. In some configurations, each passage will extend substantially over the length of the guide body between the fins and other configurations, passages may be provided which extend only part of the length over the guide body. The passage may be defined between fins and the fins may or may not extend over the length of the guide body again, dependent upon the configuration preferred. Any number of passages may be provided and the number of passages provided will be determined by the number and configuration of the fins provided.

Typically, a transparent polyether-polyurethane elastomer is used. The polymer can be coloured and in a preferred form, a first colour will typically be used for a "smart" centralising assembly and with a tracer technology (discussed further below) and a different colour used for a second centralising device without the tracer technology.

The preferred elastomer is a UV stabilized, easy flowing grade and offers good elastic recovery with resistance over a wide range of temperatures.

The preferred elastomer exhibits abrasion-resistance, impact-resistance, tear and kink-resistance, oil-resistance and grease-resistance and excellent resistance to hydrolysis and microbiological attack.

The preferred elastomer provides elasticity with good flexibility at low temperatures.

The preferred elastomer may be processed by injection molding and extrusion.

Preferably a multi-phase chemo-synthetic copolymer thermoplastic polyurethane matrix is used. The preferred polymer is formed from the inter-reaction of three components:
1. polyols (long-chain diols)
2. diisocyanates
3. short-chain diols The polyols and the short-chain diols react with the diisocyanates through polyaddition to form linear polyurethane. Flexible segments are created by the reaction of the polyol with the diisocyanate. The combination of diisocyanate with short-chain diol produces the rigid component (rigid segment). FIG. 1A shows in diagrammatic form the chain structure of a preferred thermoplastic polyurethane.

The properties of the particular polymer used will preferably depend on the nature of the raw materials, the reaction conditions, and the ratio of the starting materials to achieve the properties of the polymer desired. The polyols used have a significant influence on certain properties of the resultant thermoplastic polyurethane. Either polyester-based polyols or polyether based polyols may be used in the production of the polymeric centralising assembly.

The desired properties are distinguished by the following characteristic features:
1. Using polyester polyols:
   highest mechanical properties
   highest heat resistance
   highest resistance to mineral oils
2. Using polyether polyols:
   highest hydrolysis resistance
   best low-temperature flexibility
   resistance to microbiological degradation In addition to the basic components described above, the polymeric formulation may contain additives to facilitate production and processability, such as urea for example. Further additives can also be included to modify specific properties. Such additives include mold release agents, flame retardants, UV-stabilizers and plasticizers.

The preferred properties of the polymer used for the centralising assembly of the preferred embodiment include (these properties may be adjusted depending upon service application and operating environment):

| Property | Unit | Value | Test method according to |
|---|---|---|---|
| Hardness | Shore D | 77 | DIN 53505 |
| Density | g/cm$^3$ | 1.2 | DIN EN ISO 1183-1-A |
| Tensile strength | MPa | 50 | DIN 53504-S2 |
| Elongation at break | % | 350 | DIN 53504-S2 |
| Tear strength | N/mm | 220 | DIN ISO 34-1Bb |
| Abrasion foss | mm$^3$ | 40 | DIN ISO 4649-A |

Test plaques are manufactured by injection moulding from pre-dried granules (water content of ≤0.02%). Test plaques are aged 20 hrs at 100° C. Specimens are cut from test plaques. Test conditions: 23° C. ± 2° C. and 50% ± 6% rel. humidity.

The polymeric centralising assembly will preferably be formed using a molding technique, most preferably a cold runner injection molding system.

Preferably, the centralizer assembly has at least one cavity or pocket defined in or by the centralizer assembly for containing a tracer assembly or material, wherein the cavity or pocket is sealed until wear of the centralizer assembly breaches the cavity or pocket and the tracer assembly or material is released or is accessible. In alternative embodiments, one or more self-powered sensors (e.g., using an electronic oscillator that is regulated by a quartz crystal) for temperature, pressure and/or vibration monitoring may be provided in the pocket or cavity. Sensors such as these could be used to create low frequency specific intelligent sensor network to control and capture data from down the hole.

The shape and configuration of the cavity or pocket and the number of cavities or pockets provided typically depend on the nature of the tracer assembly or material to be used. In some configurations only, a single pocket is provided. In other configurations, more than one cavity or pocket may be provided.

If more than one cavity or pocket is provided, the cavities or pockets may be provided at the same level through the centralising assembly, that is the same depth within the thickness of the guide body.

Alternatively, the centralizer assembly may have one or more cavities at different depths and contain different tracer assemblies or materials, so that different levels of wear can be identified.

It is preferred that the or each cavity or pocket is located toward the top of the centralizer assembly toward the surface of the well.

Any type of tracer assembly or material may be used including RFID tags, preferably micro-RFID tags, coloured dye material, radioactive tracer material, and/or one or more chemicals such as corrosion inhibitors or chemical treatment provided in a pocket or cavity formed into or with the polymeric centralizer assembly which activate as the centralizer assembly or rod guide wears against the steel tubing surface.

UHF RFID tags are particularly preferred for use due to their ability to be identified so that a particular centralising assembly failure or wear condition can be isolated where multiple centralising assemblies are provided over a rod string. Multiple micro-RFID tags can be provided in the cavity or pocket defined directly adjacent to the rod prior to or concurrently with overmolding of the polymer to form the centralising assembly. The RFID tags may be linked via UHF RFID readers to a cloud software database.

The RFID tags may be read at the surface when the tags reach the surface.

Preferably, a sufficiently large number of RFID tags is used to create an RFID tag swarm once released making detection easier and more reliable due to the numbers involved.

Preferably, the centralizer assembly may include an electrolytic material, typically allowing the formation of a galvanic or electrolytic cell with any liquid passing the centralizer assembly such that the reaction products of the galvanic or electrolytic cell can be detected in the fluid. The electrolytic material may be provided in a cavity or pocket.

Preferably, the centralizer assembly may include a sacrificial member such that the fluid passing the centralizer assembly will react with the sacrificial member to form reaction products in the fluid capable of being detected. The sacrificial member may be provided in a cavity or pocket and will normally be secured therein to prevent the sacrificial member breaking free and being carried in the fluid.

In alternative embodiments, the centralizer assembly may have at least one cavity or pocket defined in or by the centralizer assembly for containing one or more sensor assemblies or material. One or more self-powered sensors (e.g., using an electronic oscillator that is regulated by a quartz crystal) for temperature, pressure and/or vibration monitoring may be provided in the pocket or cavity. Sensors such as these could be used to create low frequency, specific intelligent sensor network to control and capture data from down the hole.

According to a preferred embodiment of the method of the present invention, the separation of the sprue(s) will preferably occur concurrently with the ejection of the moulded centralising device from the mould cavity. An injection molding process is preferred for the method of manufacture.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 15 is a side view of a sucker rod coupling device with an alternative configuration of centralising device according to a preferred embodiment.

FIG. 16 is an end view of the configuration illustrated in FIG. 15.

FIG. 17 is a side view of a sucker rod coupling device with another alternative configuration of centralising device according to a preferred embodiment.

FIG. 18 is an end view of the configuration illustrated in FIG. 17.

FIG. 19 is a sectional view of the configuration illustrated in FIG. 17 along line E-E.

DETAILED DESCRIPTION

Figure 1:
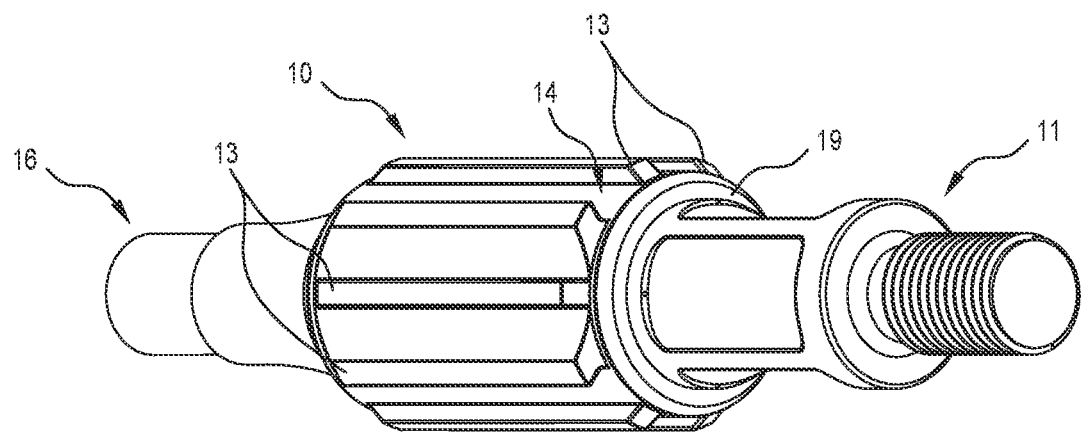
FIG. 1 is an isometric view of a sucker rod coupling device with a centralising assembly according to a preferred embodiment of the present invention.

According to the preferred embodiments, the present invention resides in a centralising device 10 for a downhole device 11 and a coupling device 11 including a centralising device 10.

The centralising device 10 of the preferred embodiments includes an elongate, annular guide body 12 for mounting on the downhole device 11 coaxially about a portion of the downhole device 11, the guide body 12 comprising a non-fibre reinforced copolymer matrix and having at least two generally longitudinally directed fins 13 extending radially from the guide body 12 and defining passages 14 therebetween for the passage of fluid, the fins 13 abutting an interior surface of the tubular portion (not shown) into which the downhole device 11 is placed in use and defining sacrificial wear surfaces against the tubular portion.

Figure 24:
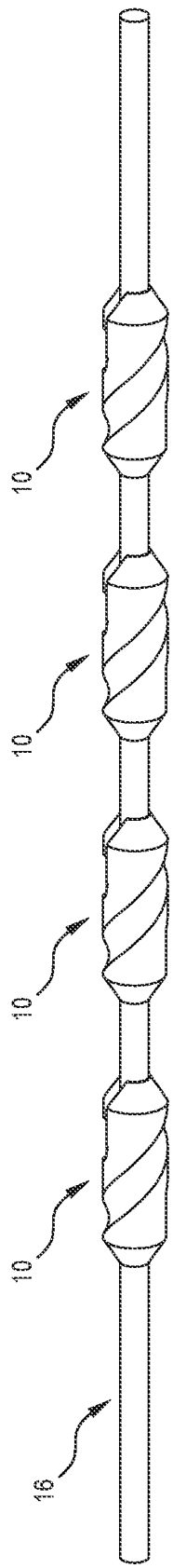
FIG. 24 is an isometric view of a downhole rod including a number of centralising assemblies.
Figure 25:
FIG. 25 is an isometric view of a downhole rod including a number of centralising assemblies.
Figure 26:
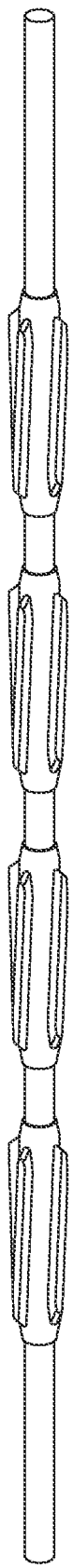
FIG. 26 is an isometric view of a downhole rod including a number of centralising assemblies.
Figure 27:
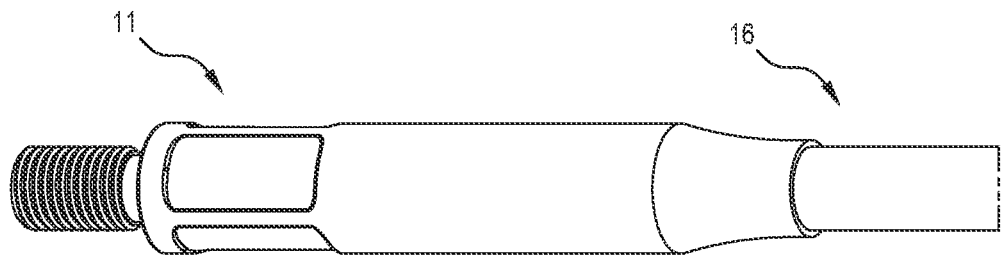
FIG. 27 is an isometric view of a conventional sucker rod coupling device.
Figure 28:
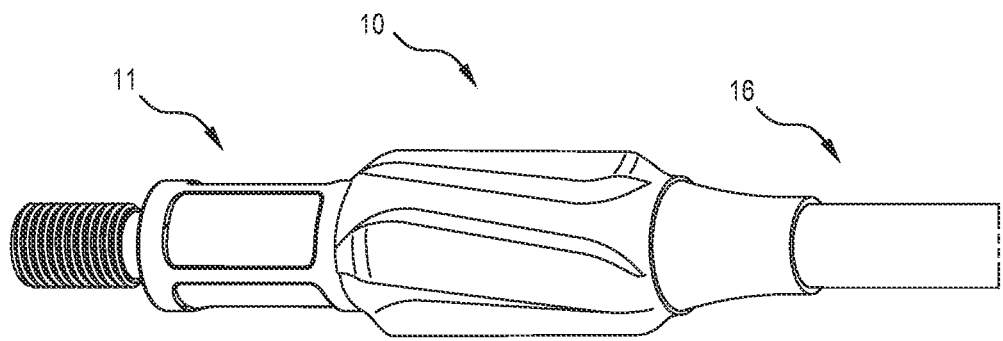
FIG. 28 is an isometric view of the sucker rod coupling device illustrated in FIG. 27 adjusted and provided with a centralising assembly according to a preferred embodiment of the present invention.
Figure 29:
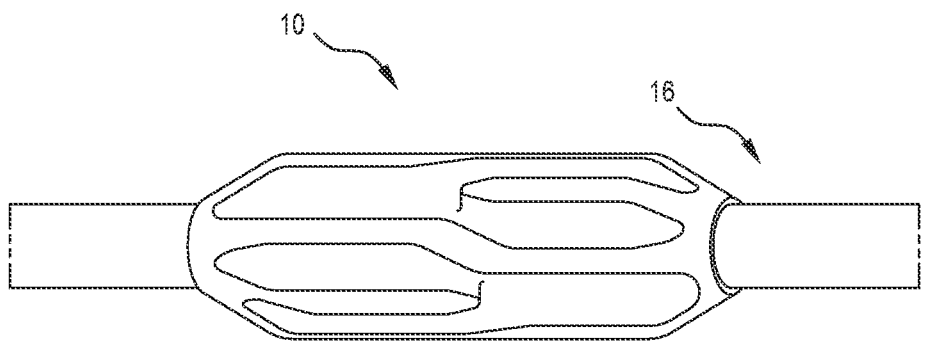
FIG. 29 is an isometric view of a fibreglass sucker rod assembly with a centralising assembly according to a preferred embodiment of the present invention.
Figure 30:
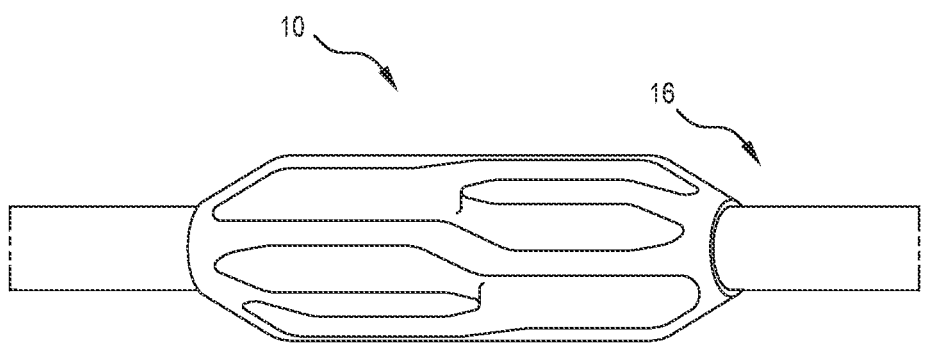
FIG. 30 is an isometric view of a fibreglass sucker rod assembly with a centralising assembly according to another preferred embodiment of the present invention.

The centralising device 10 of the present invention may be used in relation to any type of downhole device 11 for example, a sucker rod as shown in FIG. 1 for example or sucker rod string as shown in FIGS. 24 to 26 for example which typically moves in a reciprocating direction or a drill rod or drill rod string which typically rotates without substantial reciprocal movement (although reciprocating movement may also occur).

Generally, at least one centralising assembly will be provided relative to a downhole device with a number of downhole devices attached together and used end-to-end to create a string which extends over the length or a part of the length of the hole as shown in FIGS. 24 to 26. In this configuration, a number of centralising assemblies 10 will be used over the length of a downhole string.

Figure 23:
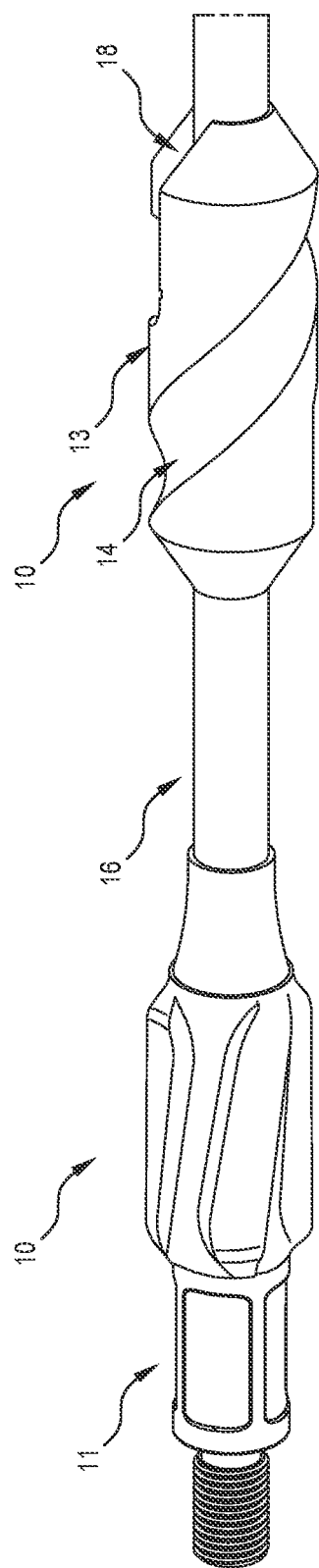
FIG. 23 is an isometric view of a fibreglass sucker rod assembly with coupling device including a centralising assembly and a second centralising assembly according to yet another preferred embodiment of the present invention.

It is also possible that a single downhole device 11 may include more than one centralising device 10 as is illustrated in FIG. 23 in which the fibreglass sucker rod device includes a first centralising device 10 on the fibreglass rod 15 itself to centralise the rod 15 and a second centralising device (in the case of the embodiment illustrated in FIG. 23, of a different configuration to the first centralising device) is provided on the rod coupler 16 to centralise the rod coupler 16. In the embodiment shown in FIG. 23, the first centralising device 10 is a "smart" centralising device with a tracer technology (discussed further below and in relation to FIGS. 10, 11, 14 and 19 and the second centralising device 10 is a simpler, centralising device without the tracer technology.

Figure 4:
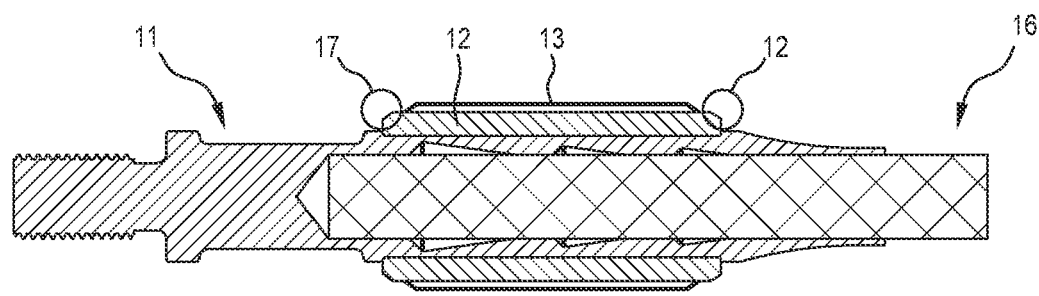
FIG. 4 is a sectional view of the configuration illustrated in FIG. 3 along line A-A.
Figure 5:
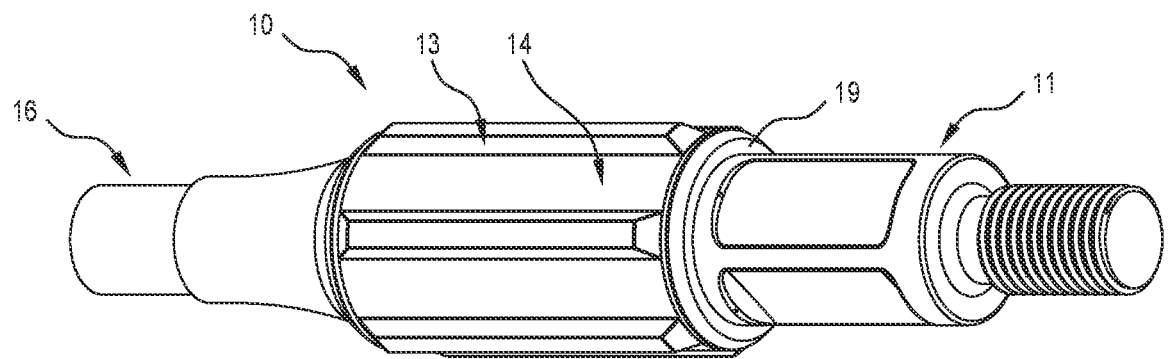
FIG. 5 is an isometric view of a sucker rod coupling device with a centralising assembly according to an alternative embodiment of the present invention.
Figure 6:
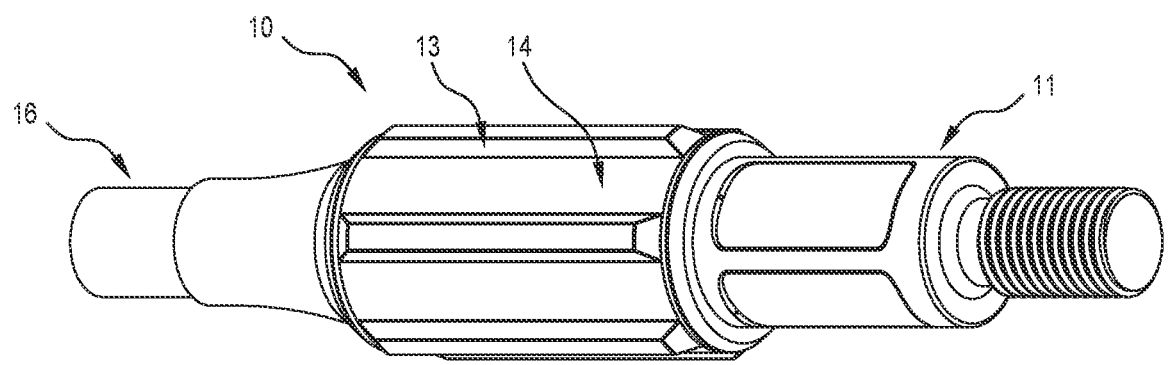
FIG. 6 is an isometric view of a sucker rod coupling device with an alternative centralising assembly according to a preferred embodiment of the present invention.
Figure 7:
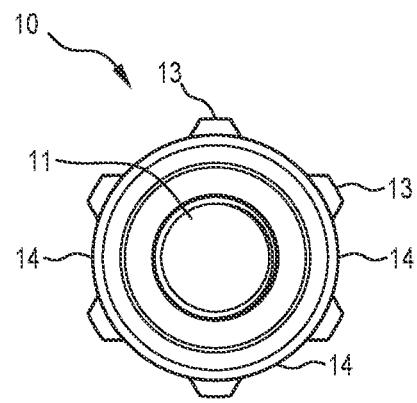
FIG. 7 is an end view of the configuration illustrated in FIG. 5.
Figure 8:
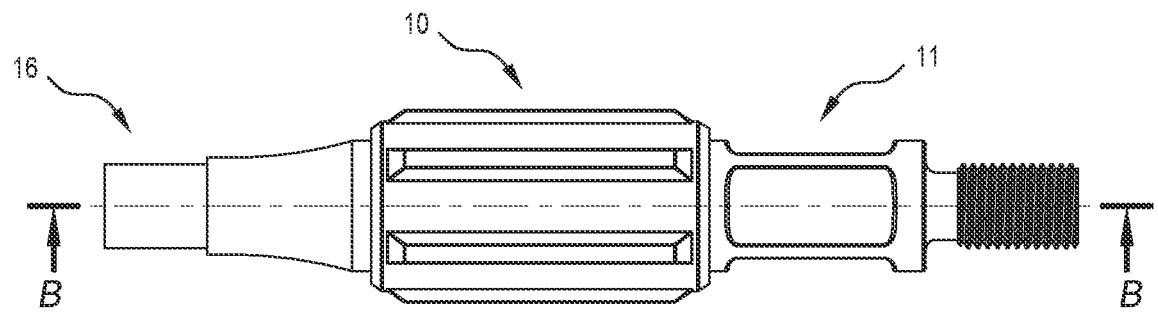
FIG. 8 is a side view of the configuration illustrated in FIG. 5.
Figure 9:
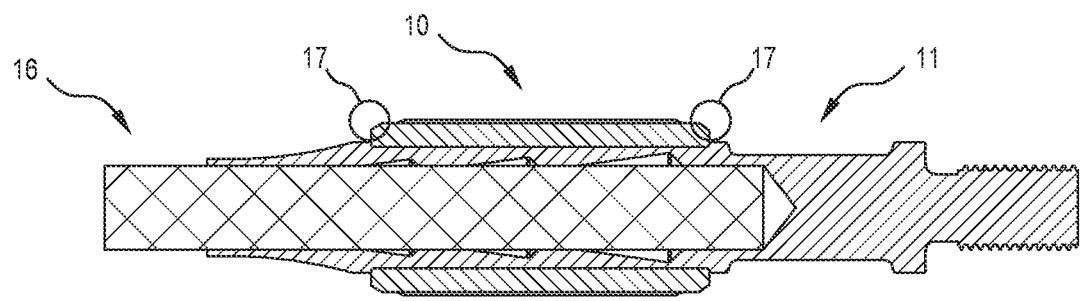
FIG. 9 is a sectional view of the configuration illustrated in FIG. 8 along line B-B.
Figure 10:
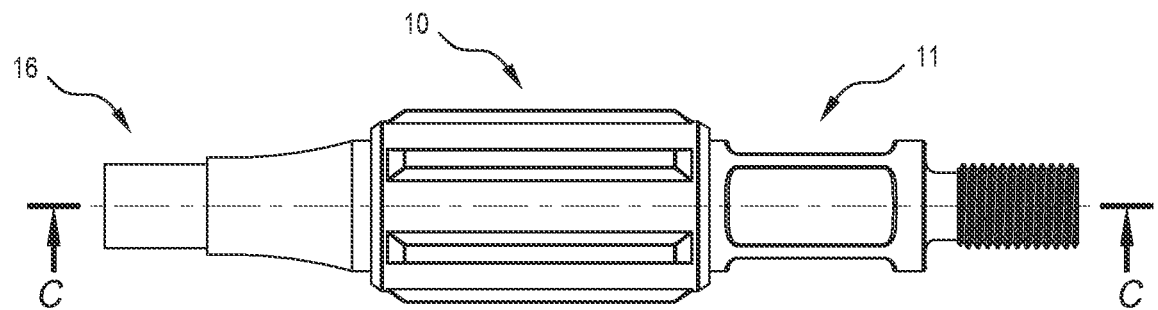
FIG. 10 is a side view of the configuration illustrated in FIG. 6.

The centralising device 10 illustrated in FIGS. 1 to 4 is fixed relative to the downhole device 11 (although in other embodiments, the centralising device may be rotatable relative to the downhole device). As shown in FIG. 4, an inner surface of the body 12 is located in a circumferential rebate as illustrated at position 17 on FIG. 4.

The centralising device may be formed about the downhole device using a moulding process or alternatively, the centralising assembly may be formed separately from the downhole device and applied or secured in position relative to the downhole device before the downhole device is inserted into the tubular portion. Usually the separately formed centralising device will require an open annular body (discussed below and an example is illustrated in FIGS. 22 and 23 on the fibreglass rod 16) with a longitudinal slot to allow mounting to the downhole device or manufacture of a pair (or more) of device parts that are attachable relative to one another to secure the centralising device relative to the downhole device.

As illustrated, the centralising device 10 includes an elongate, annular guide body 12 for mounting the centralising device 10 on the downhole device 11. The guide body 12 may be a closed annular body as illustrated in FIGS. 1 to 4 or an open annular body, an example is illustrated in FIGS. 22 and 23 on the fibreglass rod 16.

Figure 22:
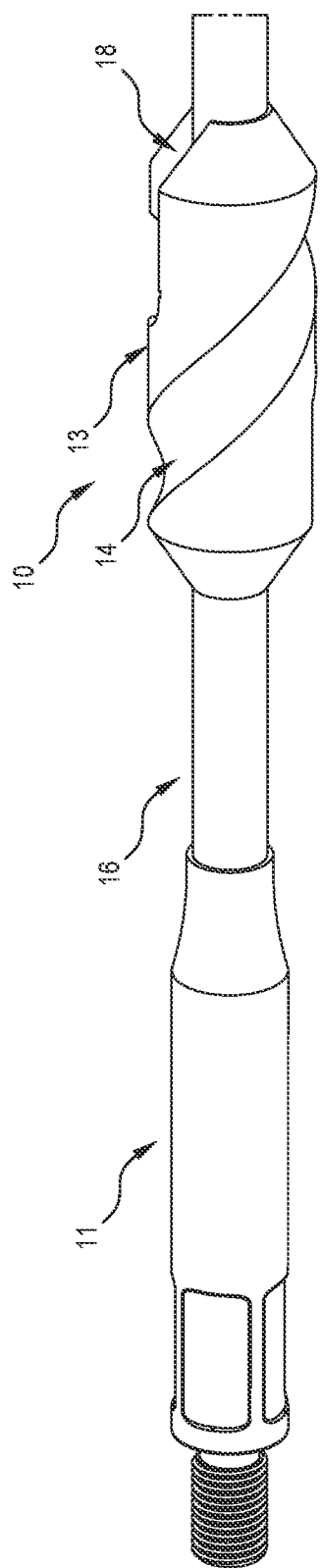
FIG. 22 is an isometric view of a fibreglass sucker rod assembly with coupling device and a centralising assembly according to a further preferred embodiment of the present invention.

In one preferred form, an example is illustrated in FIGS. 22 and 23 on the fibreglass rod 16, an open annular body may be used which is substantially annular but with a slot 18 or break extending longitudinally along at least a portion of the length of the body to allow application of the annular body 12 relative to the downhole device 11. The slot or break in the body 12 may be linear or not. In the preferred embodiment illustrated in FIGS. 22 and 23, the open annular body has a slot or break having a sawtooth appearance which extends over the length of the annular body 12.

The annular body 12 will typically be provided with a substantially central bore (not shown, obstructed) extending through the length of the body 12. The central bore of the illustrated embodiments is generally circular but the cross-sectional shape of the central bore will largely depend on the external shape of the downhole device 11 in the position relative to which the centralising device 10 is to be mounted to the downhole device 11.

The central bore will typically be sized relative to the downhole device to allow friction fit to be used (although an attachment mechanism material such as an adhesive may be used in order to securely attach the body relative to the downhole device).

The guide body 10 of the illustrated embodiments includes a generally cylindrically shaped bore and a generally cylindrically shaped outer surface.

In some embodiments illustrated such as FIGS. 1 to 18 for example, the at least two generally longitudinally directed fins 13 extend radially from an outer surface of the guide body 12. In other embodiments, the fins may be formed by providing one or more depressions into the body 12 to form the passages 14. This second configuration is illustrated in FIGS. 22 and 23 as the centralising device 10 on the fibreglass rod 16.

The guide body will typically have a pair of substantially annular end edges 19. It is preferred that each of the end edges 19 is substantially planar. Preferably, each of the end edges 19 is substantially perpendicular to the longitudinal axis of the downhole device 11 relative to which the centralising device 10 is mounted.

As illustrated, a tapered portion 21 is preferably provided adjacent to both of the end edges 19 with the tapered portion 21 tapering outwardly between the outer portion of the end edge 19 and the outer, preferably cylindrical surface of the guide body. Without wishing to be limited by theory, the provision of an angled or tapered portion will typically minimise the formation of vortices or eddy flow patterns when the centralising assembly is in use in fluid. The formation of vortices or eddy flow patterns at the ends of the centralising assembly may create optimum conditions for corrosion to occur in the downhole device and are therefore preferably avoided.

The centralising device 10 includes at least two generally longitudinally directed fins 13 extending radially from the body 12 of the centralising device 10 but typically more than two fins 13 are provided. The optimum number and configuration of the fins will typically be determined according to the use to which the downhole device 11 is to be put as well as other factors including any fluid that the downhole device may be exposed to and the movement of the downhole device, if any.

Figure 12:
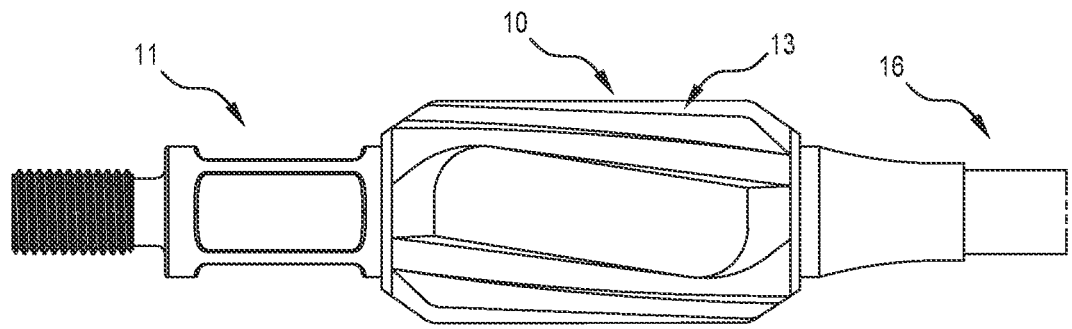
FIG. 12 is a side view of a sucker rod coupling device with an alternative configuration of centralising device according to a preferred embodiment.
Figure 13:
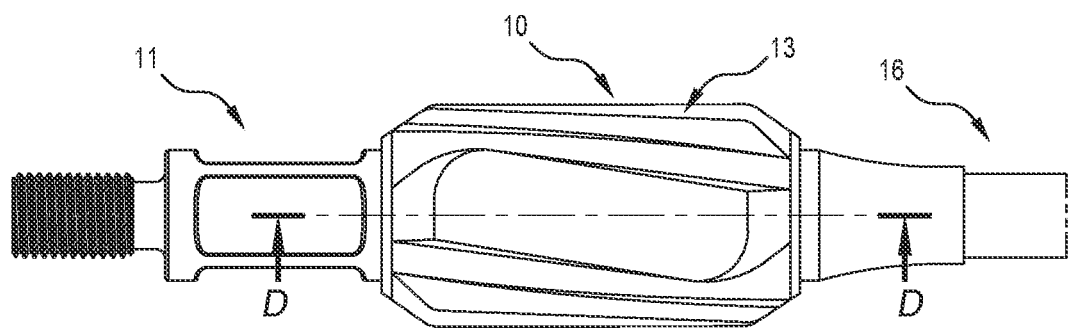
FIG. 13 is a side view of a sucker rod coupling device with another alternative configuration of centralising device according to a preferred embodiment.

In the illustrated embodiments, a number of fins 13 are provided spaced circumferentially about the external surface of the guide body 12. The fins may extend substantially linearly relative to the guide body such as is illustrated in FIGS. 1 to 11 or not as is illustrated in FIGS. 12 and 13 for example. The fins 13 may be oriented substantially parallel to the longitudinal axis of the downhole device as is illustrated in FIGS. 1 to 11.

The fins 13 may extend radially relative to the central axis of the downhole device relative to which the centralising assembly is mounted. Alternatively, one or more of the fins 13 provided may be provided at an angle relative to the outer surface of the body which is something other than substantially perpendicularly (as some of the illustrated in FIGS. 1 to 4 are). Again, this will typically be determined according to the particular use to which the downhole device and the centralising device is to be put.

Each of the fins 13 provided will typically have an angled end edges as shown. Typically, the angle of the end edges of each of the fins will substantially match the taper of the tapered portion provided between the end edge of the centralising assembly and the cylindrical surface of the body.

The fins may have any cross-sectional shape and in one form, will have a substantially rectangular cross-sectional shape.

A passage 14 is typically defined between adjacent fins 13. The passage may have any shape or configuration, and may extend any length over the guide body 12. In some configurations, each passage will extend substantially over the length of the guide body between the fins and other configurations, passages may be provided which extend only part of the length over the guide body. The passage may be defined between fins and the fins may or may not extend over the length of the guide body again, dependent upon the configuration preferred. Any number of passages may be provided and the number of passages provided will be determined by the number and configuration of the fins provided.

A transparent polyether-polyurethane elastomer is preferably used. The preferred elastomer is a UV stabilized, easy flowing grade and offers good elastic recovery with resistance over a wide range of temperatures.

The preferred elastomer may be processed by injection molding. Preferably a multi-phase chemo-synthetic copolymer thermoplastic polyurethane matrix is used. The preferred polymer is formed from the inter-reaction of three components:

1. polyols (long-chain diols);
2. diisocyanates; and
3. short-chain diols.

Figure 1A:
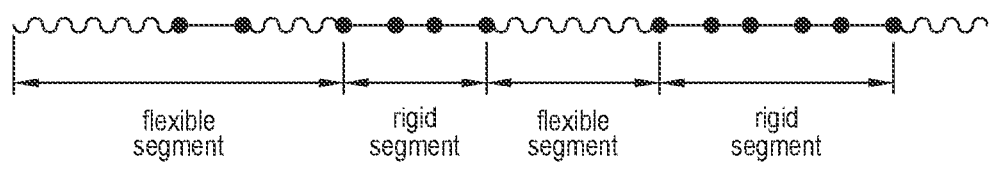
FIG. 1A illustrates a diagrammatic form of the chain structure of a preferred thermoplastic polyurethane according to a preferred embodiment of the present invention.
Figure 2:
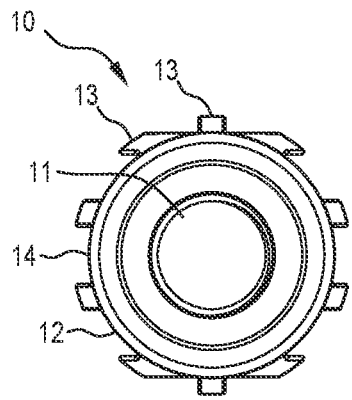
FIG. 2 is an end view of the configuration illustrated in FIG. 1.
Figure 3:
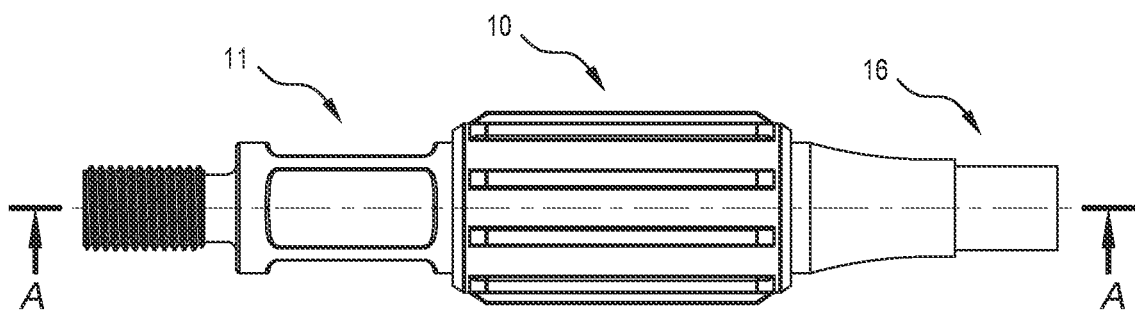
FIG. 3 is a side view of the configuration illustrated in FIG. 1.

The polyols and the short-chain diols react with the diisocyanates through polyaddition to form linear polyurethane. Flexible segments are created by the reaction of the polyol with the diisocyanate. The combination of diisocyanate with short-chain diol produces the rigid component (rigid segment). FIG. 1A shows in diagrammatic form the chain structure of a preferred thermoplastic polyurethane.

The properties of the particular polymer used will depend on the nature of the raw materials, the reaction conditions, and the ratio of the starting materials to achieve the properties of the polymer desired. The polyols used have a significant influence on certain properties of the resultant thermoplastic polyurethane. Either polyester-based polyols or polyether based polyols may be used in the production of the polymeric centralising assembly.

The desired properties are distinguished by the following characteristic features:
1. Using polyester polyols:
    highest mechanical properties
    highest heat resistance
    highest resistance to mineral oils
2. Using polyether polyols:
    highest hydrolysis resistance
    best low-temperature flexibility
    resistance to microbiological degradation In addition to the basic components described above, the polymeric formulation may contain additives to facilitate production and processability. Further additives can also be included to modify specific properties. Such additives include mold release agents, flame retardants, UV-stabilizers and plasticizers.

The preferred properties of the polymer used for the centralising assembly of the preferred embodiment include:

| Property | Unit | Value | Test method according to |
| --- | --- | --- | --- |
| Hardness | Shore D | 77 | DIN 53505 |
| Density | g/cm$^3$ | 1.2 | DIN EN ISO 1183-1-A |
| Tensile strength | MPa | 50 | DIN 53504-S2 |
| Elongation at break | % | 350 | DIN 53504-S2 |
| Tear strength | N/mm | 220 | DIN ISO 34-1Bb |
| Abrasion loss | mm$^3$ | 40 | DIN ISO 4649-A |

Test plaques are manufactured by injection moulding from pre-dried granules (water content of ≤0.02%). Test plaques are aged 20 hrs at 100° C. Specimens are cut from test plaques. Test conditions: 23° C. ± 2° C. and 50% ± 6% rel. humidity.

The polymeric centralising assembly will preferably be formed using a molding technique, most preferably a cold runner injection molding system.

Figure 11:
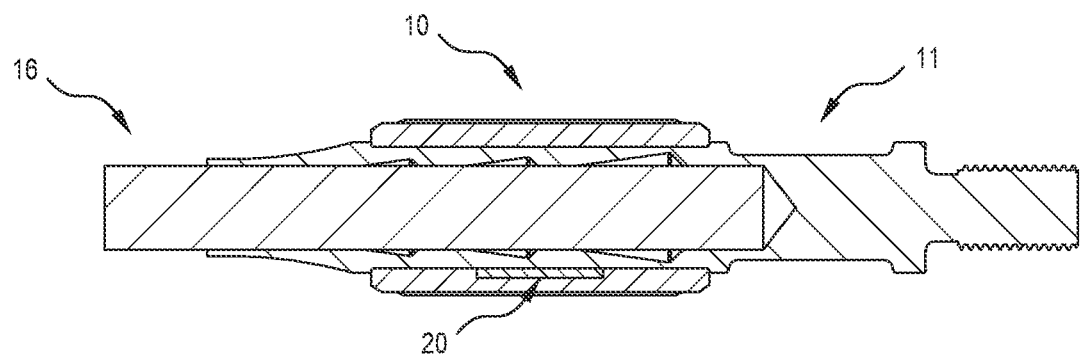
FIG. 11 is a sectional view of the configuration illustrated in FIG. 10 along line C-C.
Figure 14:
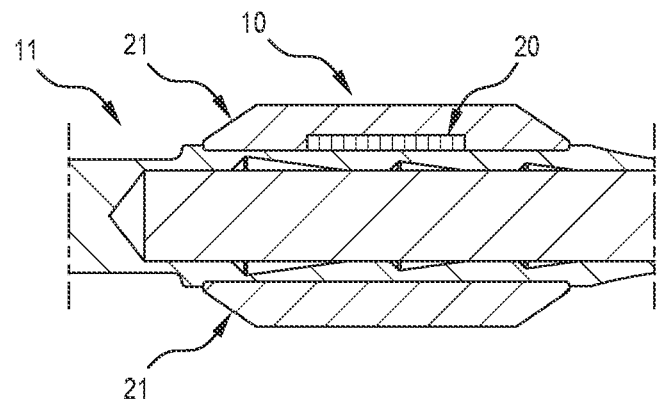
FIG. 14 is a sectional view of the configuration illustrated in FIG. 13 along line D-D.
Figure 20:
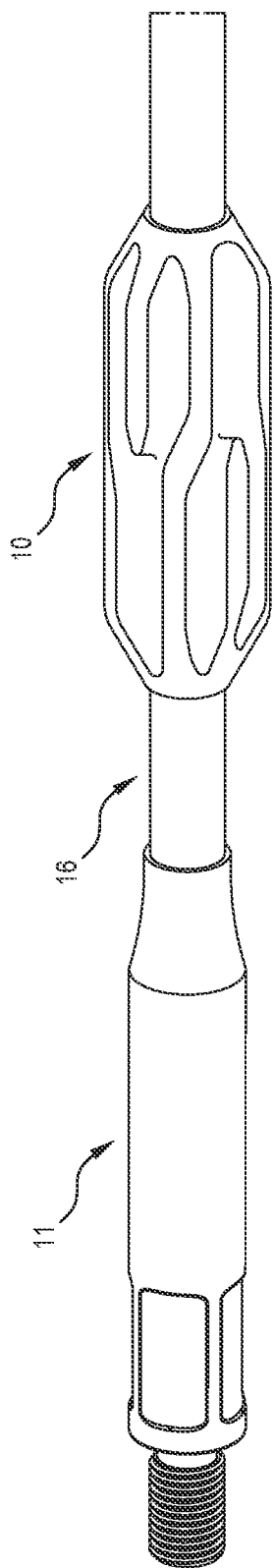
FIG. 20 is an isometric view of a fibreglass sucker rod assembly with coupling device and a centralising assembly according to a preferred embodiment of the present invention.
Figure 21:
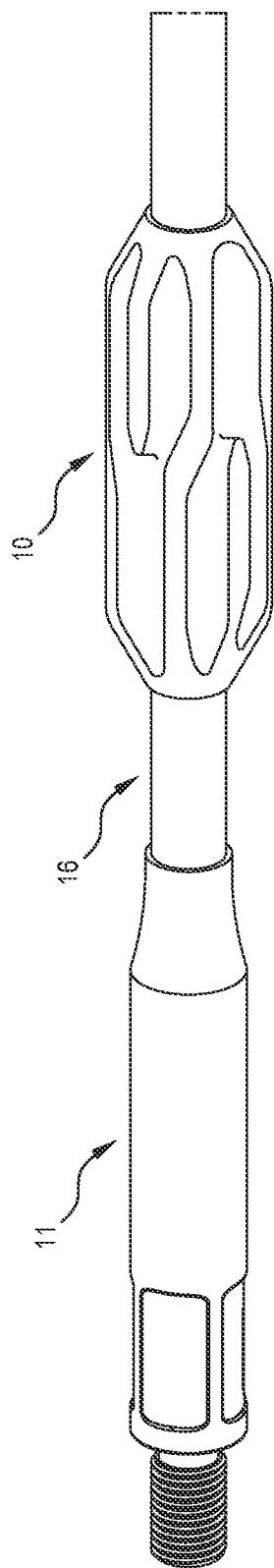
FIG. 21 is an isometric view of a fibreglass sucker rod assembly with coupling device and a centralising assembly according to another preferred embodiment of the present invention.

As shown in FIGS. 11, 14 and 19, the centralizer device 10 has a cavity or pocket 20 defined within the thickness of the centralizer device 10 or between the centralizer device and the downhole device 11 for containing a tracer assembly or material, wherein the cavity or pocket 20 is sealed until wear of the centralizer device 10 breaches the cavity or pocket 20 and the tracer assembly or material is released.

The shape and configuration of the cavity or pocket and the number of cavities or pockets provided typically depend on the nature of the tracer assembly or material to be used.

In some configurations only, a single pocket is provided. In other configurations, more than one cavity or pocket may be provided.

Any type of tracer assembly or material may be used including RFID tags, preferably micro-RFID tags, coloured dye material, radioactive tracer material, and/or one or more chemicals into a containing pocket in the polymer which activate as the rod guide wears against the steel tubing surface.

UHF RFID tags are particularly preferred for use due to their ability to be identified so that a particular centralising assembly failure or wear condition can be isolated where multiple centralising assemblies are provided over a rod string. Multiple micro-RFID tags can be provided in the cavity or pocket 20 defined directly adjacent to the rod 16 prior to or concurrently with overmolding of the polymer to form the centralising assembly 10. The RFID tags may be linked via UHF RFID readers to a cloud software database.

The RFID tags are preferably read at the surface when the tags reach the surface following their release. Preferably, a sufficiently large number of RFID tags is used to create an RFID tag swarm once released making detection easier and more reliable due to the numbers involved.

In the illustrated preferred embodiments, the centralising devices 10 including a pocket 20 with micro-RFID tags (the "smart" centralising devices) have a different colour to those without the micro-RFID tags to allow operators to easily identify the difference between the two types.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A centralising assembly for a downhole device to centre the downhole device in a tubular portion into which the downhole device is located in use, the centralising assembly comprising: an elongate, annular guide body for mounting on the downhole device coaxially about a portion of the downhole device; the guide body comprising a non-fibre reinforced copolymer matrix and having at least two generally longitudinally directed fins extending radially from the guide body of the centralising assembly and defining passages therebetween for the passage of fluid; and the fins abutting an interior surface of the tubular portion in use and defining sacrificial wear surfaces against the tubular portion.

2. The centralising assembly as claimed in claim 1, wherein the centralising assembly is fixed relative to the downhole device.

3. The centralising assembly as claimed in claim 1, wherein the centralising assembly is rotatable relative to the downhole device.

4. The centralising assembly as claimed in claim 1, wherein the centralising assembly is a sacrificial wear assembly, undergoing wear in order to maintain the downhole device substantially centrally within the tubular portion.

5. The centralising assembly as claimed in claim 1, formed about the downhole device using a moulding process.

6. The centralising assembly for a as claimed in claim 1, wherein the centralising assembly is formed separately from the downhole device and secured in position relative to the downhole device before the downhole device is inserted into the tubular portion.

7. The centralising assembly as claimed in claim 1, wherein the guide body is an open annular body which is substantially annular but with a slot or break extending longitudinally along at least a portion of the length of the body to allow application of the annular body relative to the downhole device.

8. The centralising assembly as claimed in claim 1, wherein the guide body has a generally cylindrically shaped outer surface with the at least two generally longitudinally directed fins extending radially from an outer surface of the guide body.

9. The centralising assembly as claimed in claim 1, wherein the guide body has a generally cylindrically shaped outer surface with the at least two generally longitudinally directed fins formed by providing one or more depressions into the guide body to form the passages.

10. The centralising assembly as claimed in claim 1, wherein the guide body has a pair of substantially annular end edges with an angled portion provided adjacent to at least one of the end edges with the angled portion tapering outwardly between an outer portion of the end edge and an outer surface of the guide body.

11. The centralising assembly as claimed in claim 1, wherein each of the fins provided has at least one angled end edge.

12. The centralising assembly as claimed in claim 1, wherein the non-fibre reinforced copolymer matrix is a transparent polyether-polyurethane elastomer.

13. The centralising assembly as claimed in claim 1, wherein the non-fibre reinforced copolymer matrix is a multi-phase chemo-synthetic copolymer thermoplastic polyurethane matrix.

14. The centralising assembly as claimed in claim 1, wherein the centralizer assembly has at least one cavity defined in the centralizer assembly for containing a tracer, wherein the at least one cavity is sealed until wear of the centralizer assembly breaches the cavity and the tracer is released.

15. The centralising assembly as claimed in claim 14, wherein the centralizer assembly has more than one cavity at different depths to contain different tracers, so that different levels of wear can be identified.

16. The centralising assembly as claimed in claim 14, wherein each cavity is located toward a top end of the centralizer assembly, located toward a surface.

17. The centralising assembly as claimed in claim 1, wherein the centralizer assembly has at least one cavity defined by the centralizer assembly and the downhole device for containing a tracer, wherein the at least one cavity is sealed until wear of the centralizer assembly breaches the cavity and the tracer is released.

18. A coupling device for releasably coupling downhole devices relative to one another, the coupling device comprising:
   a) an elongate body portion with an attachment portion at least one end thereof to attach the coupling device to an adjacent downhole component; and
   b) a centralising assembly to centre the downhole device in a tubular portion into which the downhole device is located in use, the centralising assembly including an elongate, annular guide body provided on the downhole device coaxially about a portion of the downhole device, the guide body comprising a non-fibre reinforced, copolymer matrix and having at least two generally longitudinally directed fins on the guide body and defining passages therebetween for the passage of fluid, the fins abutting the interior surface of the tubular portion in use and defining sacrificial wear surfaces against the tubular portion.

19. A method of manufacturing a centralising device for a downhole device including the steps of:
   a) injection of a non-fibre reinforced, copolymer matrix into a cold runner mold cavity through a mold gate from a nozzle via one or more sprue passages to fills one or more runners that lead to the mold cavity;
   b) cooling the one or more sprue passages, one or more runners, and mold gate together with a molded centralising device; and
   c) ejecting the molded centralising device from the mold cavity to separate one or more sprues which have solidified in the one or more sprue passages from the molded centralising device.

20. The method of manufacturing a centralising device for a downhole device as claimed in claim 19, wherein the separation of the one or more sprues occurs concurrently with the ejection of the moulded centralising device from the mold cavity.

* * * * *